July 22, 1958  H. WEBER ET AL  2,844,045
REMOTE CONTROL DEVICE
Filed Sept. 18, 1952
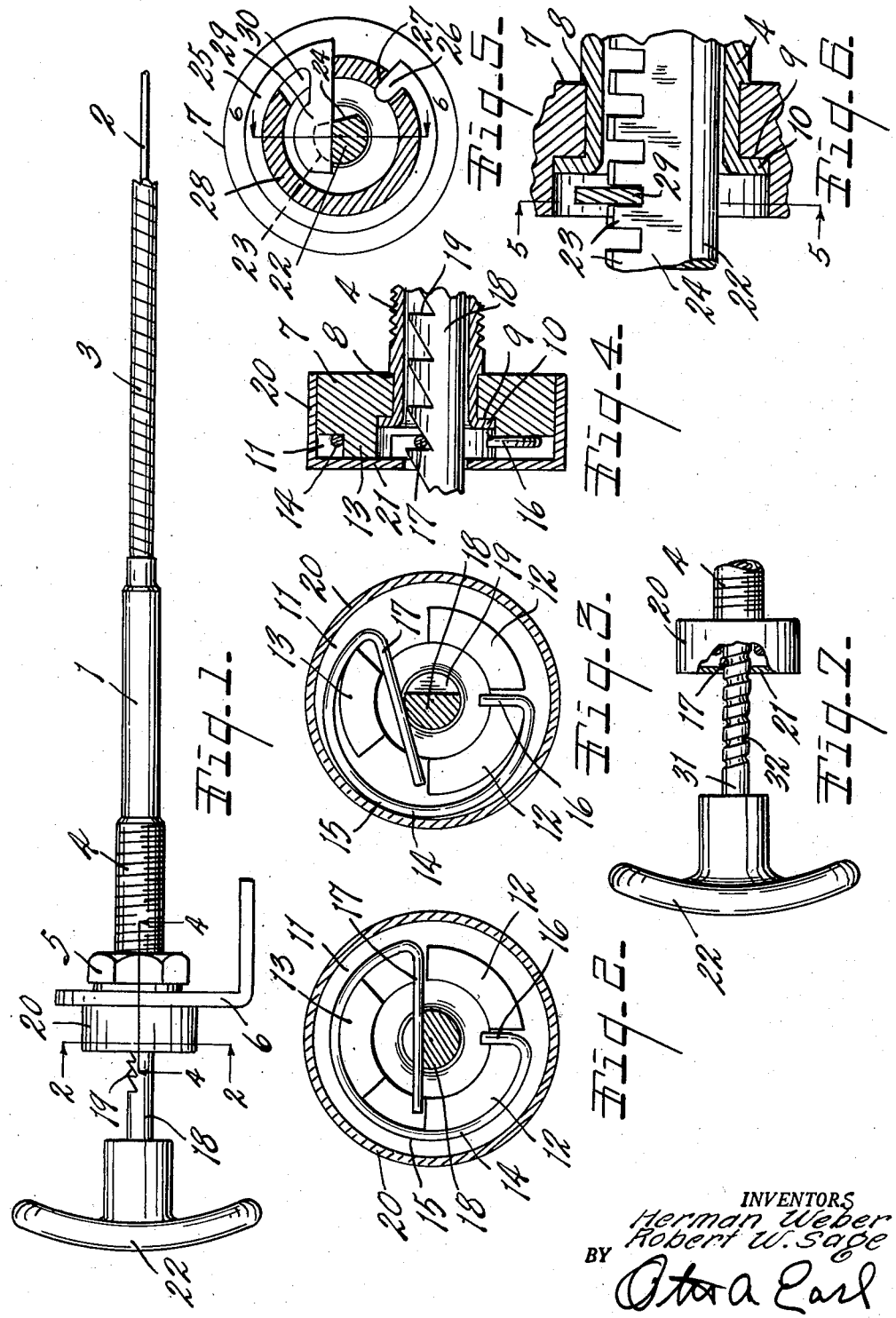
INVENTORS
Herman Weber
Robert W. Sage
BY
Otora Earl
Attorney.

United States Patent Office 2,844,045
Patented July 22, 1958

2,844,045
REMOTE CONTROL DEVICE

Herman Weber and Robert W. Sage, Kalamazoo, Mich., assignors to Shakespeare Products Company, Kalamazoo, Mich., a corporation of Michigan Application September 18, 1952, Serial No. 310,154

5 Claims. (Cl. 74—503)

This invention relates to improvements in a remote control device.

The main objects of this invention are:

First, to provide a remote control device which is well adapted for the adjusting or controlling of throttles of internal combustion engines and the like which may be easily and quickly manipulated and at the same time is efficient in holding the parts in their adjusted positions and at the same time may be quickly retracted.

Second, to provide a control device having these advantages which is very simple in its parts and one in which the parts may be easily assembled and which is durable and not likely to get out of order.

Further objects relating to details and economies of the invention will appear from the description to follow. The invention is defined and pointed out in the claims.

A preferred embodiment of the invention is illustrated in the accompanying drawing, in which:

Fig. 1 is a side view of our improved control device with the control or transmission wire or rod and its flexible sheath or housing broken away.

Fig. 2 is an enlarged transverse section on a line corresponding to line 2—2 of Fig. 1.

Fig. 3 is a transverse section corresponding to that of Fig. 2 with the control rod adjusted to position for quick retracting movement thereof.

Fig. 4 is a fragmentary view partially in section on a line corresponding to line 4—4 of Fig. 1, the control rod being shown in full lines.

Fig. 5 is a transverse section corresponding to that of Fig. 2 of a modified form or embodiment of our invention on a line corresponding to line 5—5 of Fig. 6.

Fig. 6 is an enlarged fragment view mainly in longitudinal section on a line corresponding to line 6—6 of Fig. 5.

Fig. 7 is a side elevational view of another modified form or embodiment of our invention, the modification being in the form of a control rod.

The embodiment of our invention illustrated comprises a tubular support member 1 adapted to be mounted on a frame part or other support associated with the part to be controlled. 2 represents the control rod or wire and 3 the flexible sheath therefor connected to support 1. The support 1 is provided with a threaded portion 4 receiving the clamping nut 5 for the supporting bracket 6.

The collar-like head member 7 is mounted on the support member 1 and constitutes an abutment for the bracket 6. The support member 1 has an external shoulder 8 against which the head member 7 is seated and the head member has an internal shoulder 9 which is engaged by the outturned flange 10 on the support member thereby fixedly securing the head member to the support member to in effect constitute a part of the support member.

The head member which in the embodiment illustrated is cylindrical is provided with an annular rabbet like recess 11 in its face and segmental rib-like pawl holders 12—12 and 13.

The pawl designated generally by the numeral 14 is formed of a single piece of springable stock; round wire being used in the embodiments of Figs. 1 to 4 inclusive and 7. This pawl comprises a curved body portion 15 terminating at one end in an anchoring lug 16 disposed in a recess formed by the adjacent ends of the rib segments 12. The other end of the body member is turned inwardly to provide an arm-like pawl jaw portion 17 which is disposed through openings between the ends of the holder portions 12—12 and 13.

The control rod 18 is rotatably and slidably mounted in the support and in the embodiment shown in Figs. 1 to 4 inclusive is provided with a longitudinal series of rearwardly facing ratchet teeth 19 with which the jaw 17 of the pawl coacts when the control rod is positioned as shown in Figs. 2 and 4. By rotating the control rod approximately 90° as shown in Fig. 3 the pawl is disengaged from the teeth and the control rod can be moved to retracted position or pulled to extended position without the ratchet action.

The body portion of the pawl is curved to supportingly embrace the rib members when the pawl is in ratchet position as shown in Figs. 2 and 4. The cup-like housing 20 is arranged over the head member and encloses and retains the pawl as the end portion 21 of the housing abuts against the front ends of the holder members. The control rod is provided with a handle 22 for convenience in manipulation. With the parts thus arranged the head member may be formed as a die casting and the housing as a sheet metal stamping. The pawl is formed of springable wire stock and can be quickly and easily assembled and, as stated, is retained by the housing. This results in a structure which may be very economically produced and at the same time is efficient and durable.

In the embodiment of our invention shown in Figs. 5 and 6 the control rod 22 is provided with a series of straight sided teeth 23 and a flattened side section 24 merging into the teeth at one side thereof. The spring pawl 25 is formed of flat stock and has an anchoring lug 26 at one end thereof engaging an opening 27 in the rib like holder 28 and a jaw portion 29 at the other end corresponding to the jaw portion 17 of the previously described embodiment. This jaw portion is arranged through an opening 30 in the holder; see Fig. 5. As the teeth 23 are straight sided in order to adjust the control rod it is necessary to rotate the same to bring the pawl jaw into coacting relation with the side section 24 of the control rod. When the control rod is suitably positioned it is rotated to position the jaw of the pawl between an adjacent pair of teeth as is shown in Figs. 5 and 6. Otherwise, the structure is essentially the same as that of Figs. 1 to 4 inclusive.

In the modification shown in Fig. 7 the control rod 31 has a spiral groove 32 therein with which the jaw member 17 of the pawl coacts. This structure is the same as that of Figs. 1 to 4 inclusive with the exception that the control rod has the spiral groove instead of the ratchet teeth. However, the pawl acts as a rachet when the control rod is forcibly moved longitudinally. In this structure the control rod is adjusted to approximate position by longitudinal movement thereof with the pawl racheting thereon and is then finely adjusted by rotation of the control rod.

The applicants are familiar with the Weber Patent No. 2,101,160 issued December 7, 1937, and the structure of the applicants present invention is a substantial improvement thereon in the matter of economy in production and simplicity and durability and assembly of the parts in operation.

We have illustrated and described our improvement in a highly practical embodiment thereof. We have not attempted to illustrate or describe other embodiments or adaptations as it is believed that this disclosure will enable those skilled in the art to embody or adapt our invention as may be desired.

Having thus described the invention what is claimed as new and desired to secure by Letters Patent is:

1. In a control device the combination of a tubular support having a forwardly facing external shoulder adjacent its front end, a cylindrical head member having an internal forwardly facing recess and sleeved upon said support in abutting relation to said shoulder thereon, the end of said support being turned outwardly into retaining engagement with the bottom of the recess of said head member, said head member having curved segmental angularly spaced adjacent rib-like portions on its front end, said rib portions being spaced from the periphery of the head member, a control rod reciprocable and rotatable in said support and having a longitudinal series of rearwardly facing ratchet teeth, a spring pawl formed integrally of spring stock and comprising a curved springable body portion terminating at one end in an inturned anchoring lug engaged in a recess in one of said rib portions and terminating at its opposite end in an inturned springable jaw portion disposed through opposed openings between said adjacent rib portions transversely across said rod and engaging said control rod under spring stress, said body portion of said pawl being in supported engagement with the peripheries of the rib portions embraced by said body portion when the jaw portion is engaged with the teeth of the control rod and being sprung outwardly therefrom when the control rod is rotated to disengage the jaw portion from the teeth to permit retracting movement of the control rod, and a housing embracing said head member and enclosing and retaining said pawl.

2. In a control device the combination of a tubular support, a head member fixedly mounted on said support, said head member having curved segmental angularly spaced adjacent rib-like portions on its front end, said rib portions being spaced from the periphery of the head member, a control rod reciprocable and rotatable in said support and having a longitudinal series of rearwardly facing ratchet teeth, a spring pawl formed integrally of spring stock and comprising a curved springable body portion terminating at one end in an inturned anchoring lug engaged in a recess in one of said rib portions and terminating at its opposite end in an inturned springable jaw portion disposed through opposed openings between adjacent rib portions transversely across said rod and engaging said control rod under spring stress, said body portion of said pawl being in supported engagement with the peripheries of the rib portions embraced by said body portion when the jaw portion is engaged with the teeth of the control rod and being sprung outwardly therefrom when the control rod is rotated to disengage the jaw portion from the teeth to permit retracting movement of the control rod, and a housing embracing said head member and enclosing said pawl.

3. In a control device, the combination of a tubular support having a forwardly facing external shoulder adjacent its front end, a head member having an internal forwardly facing recess and sleeved upon said support in abutting relation to said shoulder thereon, the end of said support being turned outwardly in retaining engagement with the bottom of the recess of said head member, said head member having curved segmental angularly spaced adjacent rib-like portions on its front end, said rib portions being spaced from the periphery of the head member, a toothed rod reciprocable and rotatable in said support, a pawl formed integrally of spring stock and comprising a curved springable body portion terminating at one end in an inturned anchoring lug engaged in a recess in one of said ribs and terminating at its opposite end in an inturned integral springable jaw portion disposed through an opening between adjacent rib portions transversely across said rod and engaging said control rod under spring stress, said body portion of said pawl being in supported engagement with the rib portions embraced by said body portion when the jaw portion is engaged with the teeth of the control rod and being sprung outwardly therefrom when the control rod is rotated to disengage the jaw portion from the teeth, and a housing embracing said head member and enclosing said pawl.

4. In a control device, the combination of a tubular support, a cylindrical head member fixedly mounted on said support, said head member having an annular rabbet-like recess in the face thereof providing a forwardly projecting curved pawl holder, a control rod reciprocable and rotatable in said support and having a longitudinal series of alternate projections and recesses on one side thereof, a pawl comprising a body portion disposed in said annular recess and terminating at one end in an inturned anchoring lug engaged with said pawl holder and terminating at its opposite end in an inturned springable jaw portion extending transversely across said rod and engaging said control rod, said pawl holder having a recess therein for receiving said anchoring lug and having an opening therethrough through which said jaw portion projects for engaging said control rod, and a housing on said head member enclosing said pawl.

5. In a control device, the combination of a tubular support, a cylindrical head member fixedly mounted on said support, said head member having an annular rabbet-like recess in the face thereof providing a forwardly projecting curved pawl holder, a control rod reciprocable and rotatable in said support and having a spiral groove therein, a pawl comprising a springable body portion terminating at one end in an inturned anchoring lug engaged with said pawl holder and terminating at its opposite end in an inturned springable jaw portion extending transversely across said rod and engaging in the spiral groove of said control rod under spring stress, said pawl holder having a recess therein for receiving said anchoring lug and having an opening therethrough through which said jaw portion projects for engaging said control rod, and a housing on said head member enclosing said pawl.

References Cited in the file of this patent

UNITED STATES PATENTS

| | | |
|---|---|---|
| 1,245,939 | Mallatt | Nov. 6, 1917 |
| 1,989,961 | Winning | Feb. 5, 1935 |
| 2,044,492 | Baldwin | June 16, 1936 |
| 2,101,160 | Weber | Dec. 7, 1937 |
| 2,132,919 | Arens | Oct. 11, 1938 |
| 2,134,756 | Gerry | Nov. 1, 1938 |
| 2,256,696 | Weber | Sept. 23, 1941 |
| 2,377,691 | Jandus | June 5, 1945 |
| 2,580,026 | Jacobi | Dec. 25, 1951 |
| 2,656,785 | Jones | Nov. 10, 1953 |

FOREIGN PATENTS

| | | |
|---|---|---|
| 40,476 | France | Apr. 11, 1932 |
| | (Addition to No. 711,413) | |
| 43,902 | France | July 2, 1934 |
| | (Addition to No. 755,967) | |
| 44,170 | France | Aug. 20, 1934 |
| | (Addition to No. 755,967) | |
| 807,731 | Germany | July 2, 1951 |